(12) United States Patent
Gladstone et al.

(10) Patent No.: US 10,512,809 B2
(45) Date of Patent: Dec. 24, 2019

(54) FIRE MONITORING AND SUPPRESSION SYSTEM

(71) Applicant: Fire Rover, LLC, Ferndale, MI (US)

(72) Inventors: Bradley Steven Gladstone, Commerce, MI (US); Jeremy Douglas Dusing, Troy, MI (US); Peter John Marry, Commerce, MI (US)

(73) Assignee: Fire Rover LLC, Ferndale, MI (US)

( * ) Notice: Subject to any disclaimer, the term of this patent is extended or adjusted under 35 U.S.C. 154(b) by 0 days.

(21) Appl. No.: 15/071,807

(22) Filed: Mar. 16, 2016

(65) Prior Publication Data

US 2016/0271434 A1 Sep. 22, 2016

Related U.S. Application Data

(60) Provisional application No. 62/133,559, filed on Mar. 16, 2015.

(51) Int. Cl.
*A62C 37/40* (2006.01)
*H04L 29/08* (2006.01)
*A62C 31/24* (2006.01)

(52) U.S. Cl.
CPC ............. *A62C 37/40* (2013.01); *A62C 31/24* (2013.01); *H04L 67/12* (2013.01)

(58) Field of Classification Search
CPC ......... A62C 37/40; A62C 31/24; A62C 31/28; A62C 35/68; A62C 37/00; A62C 3/0271;

(Continued)

(56) References Cited

U.S. PATENT DOCUMENTS 5,379,676 A * 1/1995 Profeta ...................... F41G 3/02
89/41.05
6,184,792 B1 * 2/2001 Privalov ................. F23N 5/082
250/336.1

(Continued)

FOREIGN PATENT DOCUMENTS

WO 98/07471 A2 2/1998
WO 99/52599 A1 10/1999

(Continued)

*Primary Examiner* — Christopher S Kim
*Assistant Examiner* — Juan C Barrera
(74) *Attorney, Agent, or Firm* — Honigman LLP

(57) ABSTRACT

A system for detecting and extinguishing fires occurring within a predetermined observation area in response to commands received from a monitoring center. The system includes a source of fire retardant liquid and a monitor for selectively directing liquid to the observation area. A valve is disposed in fluid communication between the source and the monitor and is selectively movable between a closed position wherein liquid is prevented from flowing through the valve, and an open position wherein liquid can flow through the valve. An infrared camera generates a signal in response to temperature changes occurring in the observation area. A network switch is provided for communicating with the monitoring center. A control unit in communication with the valve, the camera, and the network switch relays the signal to the monitoring center and moves the valve between the positions in response to commands received from the monitoring center.

15 Claims, 2 Drawing Sheets

(58) Field of Classification Search
CPC ..... A62C 3/0292; A62C 99/00; A62C 99/009; A62C 3/04; A62C 3/06; A62C 3/00; A62C 35/605; A62C 37/10; H04L 67/12; B05B 15/652; B05B 12/00–40; A01G 25/09; A01G 25/167; A01G 25/16; A01G 25/165; A01M 7/0089
USPC .............. 169/9, 61, 56, 60; 239/67, 69
See application file for complete search history.

(56) References Cited

U.S. PATENT DOCUMENTS

| | | | |
|---|---|---|---|
| 6,289,331 B1 | 9/2001 | Pedersen et al. | |
| 6,975,225 B2* | 12/2005 | Privalov | A62C 3/0271 340/539.25 |
| 7,271,704 B2 | 9/2007 | McSheffrey et al. | |
| 8,245,790 B2* | 8/2012 | Lozier | A62C 31/28 169/24 |
| 8,606,373 B2* | 12/2013 | Lozier | A62C 37/00 169/54 |
| 8,714,466 B2* | 5/2014 | Trapp | A62C 31/005 169/24 |
| 2008/0215190 A1* | 9/2008 | Pillar | B60T 17/221 701/1 |
| 2009/0055486 A1* | 2/2009 | Chen | H04L 51/04 709/206 |
| 2009/0301735 A1* | 12/2009 | Trapp | A62C 31/05 169/5 |
| 2010/0023162 A1 | 1/2010 | Gresak et al. | |
| 2011/0253397 A1* | 10/2011 | Combs | A62C 31/28 169/51 |
| 2014/0118143 A1 | 5/2014 | Monacos et al. | |
| 2015/0375023 A1* | 12/2015 | Seliverstov | A62C 13/66 169/9 |

FOREIGN PATENT DOCUMENTS

| | | |
|---|---|---|
| WO | 2008/001409 A1 | 1/2008 |
| WO | 2009/129875 A1 | 10/2009 |

* cited by examiner

FIRE MONITORING AND SUPPRESSION SYSTEM

CROSS-REFERENCE TO RELATED APPLICATION

This application is based upon and claims priority to U.S. Provisional Patent Application No. 62/133,559, filed on Mar. 16, 2015.

BACKGROUND OF INVENTION

1. Field of Invention

The present invention relates, generally, to fire suppression systems and, more specifically, to a fire monitoring and suppression system.

2. Description of the Related Art

Fire suppression systems are used in connection with preventing or otherwise minimizing fire damage to real and personal property. To that end, conventional fire suppression systems typically include a source of fluid, such as water or a fire retardant chemical, disposed in fluid communication with a nozzle that is used to spray or otherwise direct the fluid to an active fire. The source of fluid may be realized in a number of different ways, such as by a storage tank or a high-flow industrial water utility connection, and may be portable, such as with a municipal firefighting truck/tanker. Typically, the nozzles are configured to be moved, re-positioned, or otherwise manipulated in relation to the source of fluid. By way of example, a length of hose or pipe extending between the nozzle and the source of fluid may be employed so that the nozzle can be selectively moved away from the source of fluid while maintaining fluid communication therewith. Fire suppression systems also typically include a valve interposed in fluid communication between the source of fluid and the nozzle. The valve is used to selectively control the flow of water or fire retardant liquid, and is frequently positioned at or near the nozzle.

Most fire suppression systems can be characterized as either a "responsive" or a "preventative" system. Responsive systems are used to extinguish what are generally "unexpected" fires (for example, where a municipal fire truck is dispatched to extinguish a residential house fire). Preventative systems, on the other hand, are used in connection with extinguishing fires in predetermined, and often high-risk, areas (for example, a fire sprinkler system positioned near a gas pumping station). However, certain fire suppression systems can be both responsive and preventative, depending on the application and intended use (for example, a hand-operated fire extinguisher stored in a fry kitchen occasionally used to put out grease fires). It will be appreciated that both responsive and preventative fire suppression systems may vary in terms of system size, extinguishing capability, and mobility.

Fire suppression systems may also include or otherwise cooperate with one or more fire detection systems. As the name suggests, fire detection systems are used to detect and respond to fire ignition. Typically, fire detection systems respond to the presence of fire by sounding a warning alarm (for example, a residential smoke detector alarm) and/or by automatically activating one or more suppression systems (for example, activating a fire sprinkler). Thus, fire detection systems are frequently used to warn people nearby of potential danger and, at the same time, may prompt those people to manually activate one or more fire suppression systems (for example, calling a fire department dispatch center).

Each of the components of a fire suppression system of the type described above must cooperate to detect and extinguish fire in an expedited amount of time so as to minimize damage and prevent the fire from spreading or growing uncontrollably. In addition, each of the components must be designed so as to ensure optimized and efficient use of the available supply of fluid from the source. While fire suppression systems known in the related art have generally performed well for their intended purpose, there remains a need in the art for a fire suppression system with superior responsive and preventative operational characteristics which, at the same time, minimizes or otherwise prevents fire damage in a simple, reliable, and cost effective way.

SUMMARY OF THE INVENTION

The present invention overcomes the disadvantages in the related art in a fire suppression system for detecting fires occurring within a predetermined observation area and for extinguishing such fires in response to commands received from a distant monitoring center across a communication network. The fire suppression system includes a source of fire retardant liquid and a monitor for selectively directing fire retardant liquid to the observation area. A control valve is disposed in fluid communication between the source and the monitor. The control valve is selectively movable between a valve closed position wherein fire retardant liquid is prevented from flowing through the control valve, and a valve open position wherein fire retardant liquid can flow through the control valve to the monitor. A forward looking infrared camera is provided. The forward looking infrared camera is adapted to detect and generate a signal in response to predetermined temperature changes occurring within the observation area. The fire suppression system also includes a network switch for communicating with the monitoring center across the communication network, and a control unit in electrical communication with the control valve, the forward looking infrared camera, and the network switch. The control unit is adapted to relay the signal generated by the forward looking infrared camera to the monitoring center across the communication network. The control unit is further adapted to move the control valve between the valve closed position and the valve opened position in response to subsequent commands received from the monitoring center across the communication network.

In this way, the fire suppression system of the present invention significantly improves the detection of fires and, at the same time, facilitates selectively controllable fire extinguishing in an efficient and safe manor. Further, the present invention provides advantages related to minimizing fire damage and preventing fire from spreading or growing uncontrollably. In particular, the fire suppression system of the present invention provides significant opportunities for remotely located industrial areas where municipal fire department response times may be inadequate.

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1:
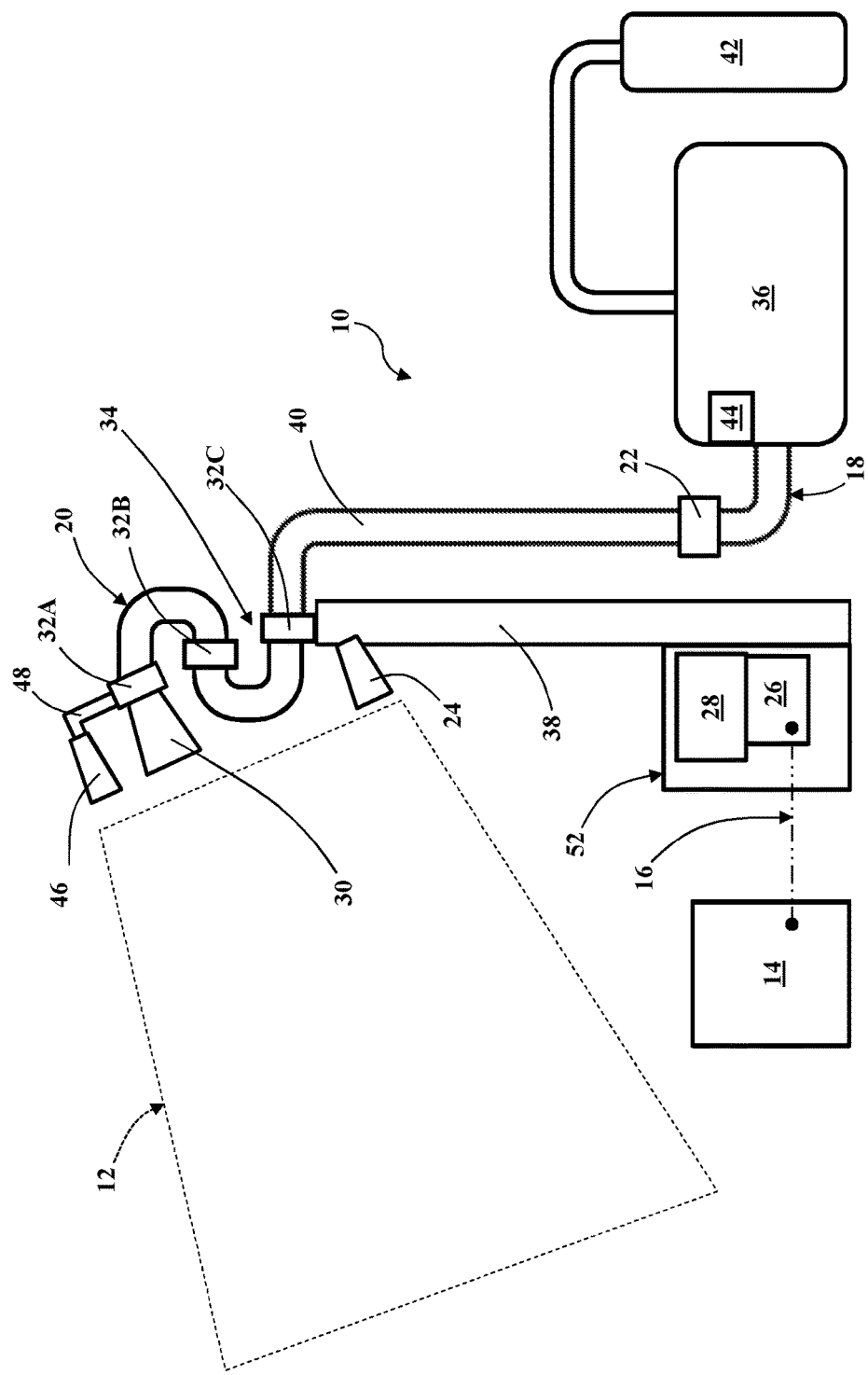
FIG. 1 is a diagrammatic representation of a fire suppression system according to one embodiment of the present invention.

Referring now to the drawings, wherein like numerals indicate like structure throughout the several views, a fire suppression system is generally indicated at 10 in FIG. 1. The fire suppression system 10 is used to detect and extinguish fires occurring within a predetermined observation area, generally indicated at 12. Specifically, the fire suppression system 10 is adapted to detect the presence of fire in the predetermined observation area 12 and is configured to subsequently facilitate fire extinguishing in response to commands received from a distant monitoring center 14 across a communication network 16 (indicated by dash-dot-dot-dash lines in FIGS. 1 and 2). To that end, the fire suppression system 10 includes a source of fire retardant liquid 18, a monitor 20 for selectively directing the fire retardant liquid to the observation area 12, and a control valve 22 disposed in fluid communication between the source 18 and the monitor 20. The fire suppression system 10 also includes a forward looking infrared camera 24 adapted to detect the presence of fire in the observation area 12, a network switch 26 for communicating with the monitoring center 14, and a control unit 28 disposed in electrical communication with the various components of the fire suppression system for sending signals to and receiving commands from the monitoring center 14. Each of these components will be described in greater detail below.

As noted above, the monitor 20 is used to selectively direct fire retardant liquid into or otherwise towards the observation area 12. The monitor 20 (sometimes referred to in the related art as a "deck gun," a "master stream," or a "water cannon") is typically adjustable in orientation and includes a nozzle 30 disposed in selective fluid communication with the control valve 22. The nozzle 30 is employed to facilitate adjustment of the pressure and/or flowrate of the fire retardant liquid by "fogging" or "fanning" the stream of fire retardant liquid. By changing the flowrate via the nozzle 30, the monitor 20 can be used to direct liquid from the source 18 at selectively adjustable distances. In one embodiment, the nozzle 30 includes a nozzle actuator 32A operatively attached to the nozzle 30 and disposed in electrical communication with the control unit 28 (see FIG. 2) which, in turn, is used to selectively drive the nozzle actuator 32A to adjust the flow of fire retardant liquid through the nozzle 30.

In one embodiment, the monitor 20 employs a multi-axis articulation system, generally indicated at 34, which is configured to selectively orientate the monitor 20 so as to effect positional control of the nozzle 30 in order to aim fire retardant liquid flowing from the monitor 20 within the observation area 12. Those having ordinary skill in the art will appreciate that the articulation system 34 could be operatively attached to or integrated directly with the monitor 20, or the monitor 20 could be operatively attached to the articulation system 34, without departing from the scope of the present invention.

Figure 2:
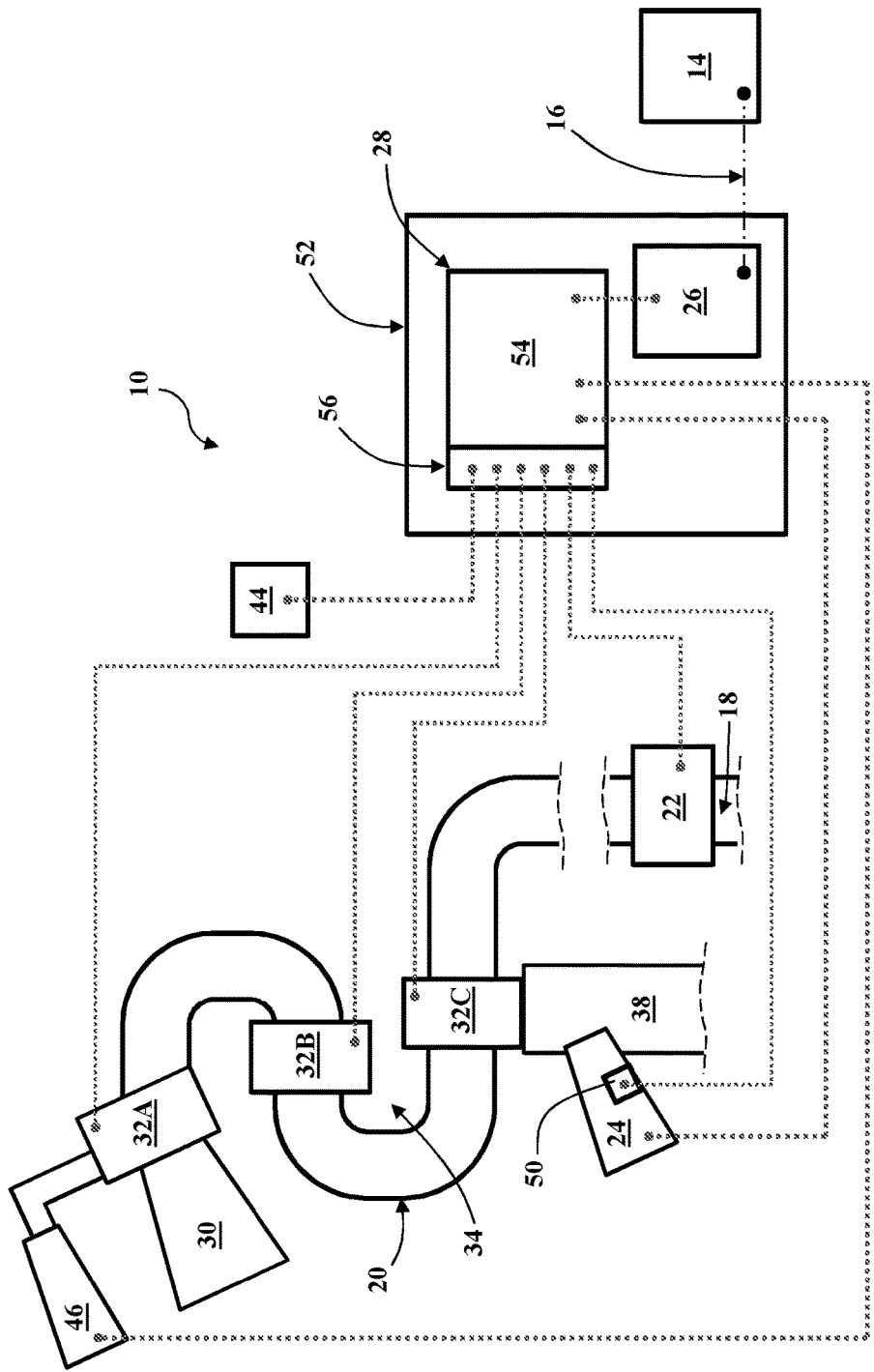
FIG. 2 is an electrical communication schematic of portions of the fire suppression system depicted in FIG. 1.

In order to effect positional control of the monitor 20, the articulation system 34 includes one or more articulation actuators 32B, 32C operatively attached to the monitor 20 and disposed in electrical communication with the control unit 28 (see FIG. 2). Here, the articulation actuators 32B, 32C are configured to allow selective movement of the monitor 20 left and right and/or up and down so as to correspondingly aim fire retardant liquid to different locations within the observation area 12. Those having ordinary skill in the art will appreciate that the actuators 32A, 32B, 32C may be of any suitable type sufficient to be driven by the control unit 28 so as to adjust the control valve 22 and the articulation system 34, respectively, without departing from the scope of the present invention. Moreover, it will be appreciated that the actuators 32A, 32B, 32C can be operatively attached to or otherwise integrated with the control valve 22 and the articulation system 34, respectively, in any suitable way without departing from the scope of the present invention.

In the representative embodiment illustrated in FIG. 1, the source 18 of fire retardant liquid is realized as a tank 36. The tank 36 is used to store and selectively provide fire retardant liquid to the monitor 20 via the control valve 22. In this embodiment, the monitor 20 is mounted to a pole 38 and is positioned vertically above the tank 36. It will be appreciated that this configuration simplifies access to the source 18 and, at the same time, allows advantageous positioning of the monitor 20 with respect to the observation area 12. Here, a hose 40 is disposed in fluid communication between the tank 36 and the monitor 20 so as to direct fire retardant liquid from the tank 36 to the monitor 20, as described in greater detail below. Specifically, in the representative embodiment illustrated in FIG. 1, the control valve 22 is mounted adjacent to and in fluid communication with the source 18, and the hose 40 extends generally vertically from the control valve 22 to the monitor 20 so as to direct fire retardant liquid from the source 18 to the monitor 20. However, it will be appreciated that the control valve 22 could be arranged in any suitable way sufficient to direct fire retardant liquid from the source 18 to the monitor 20 without departing from the scope of the present invention. Similarly, it will be appreciate that the hose 40 could be of any suitable type of configuration sufficient to direct fire retardant liquid from the source 18 to the monitor 20 without departing from the scope of the present invention. By way of non-limiting example, the hose 40 could be implemented as one or more portions of rigid pipes and/or flexible tubing.

In order to displace the fire retardant liquid upwards towards the monitor 20, the tank 36 may disposed in fluid communication with one or more pressurized gas tanks, generally indicated at 42, which are adapted to pressurize the tank 36 with respect to the outside environment so as to facilitate fluid displacement towards the monitor 20 through the control valve 22. Here, one or more sensors 44, such as fluid level or pressure sensors disposed in electrical communication with the control unit 28 may be employed so as to facilitate control of the fire suppression system 10, as described in greater detail below. It is also conceivable that a pump assembly (not shown, but generally known in the art) could be employed to direct fire retardant liquid from the tank 36 towards the monitor 20.

Those having ordinary skill in the art will appreciate that the tank 36 could be used to store or hold any suitable type of fire retardant liquid, such as water or a predetermined mixture of water and concentrated fire retardant foam, and could be positioned in any suitable way with respect to the monitor 20, without departing from the scope of the present invention. Moreover, it will be appreciated that the fire suppression system 10 could use a differently configured source 18 of fire retardant liquid, such as a conventional well or an industrial water utility connection (not shown, but generally known in the art), either alone or in connection with stored concentrated fire retardant foam, without departing from the scope of the present invention.

As noted above, the fire suppression system 10 also includes a control valve 22 interposed in fluid communication between the source 18 and the monitor 20. The control valve 22 is selectively movable between a valve closed position wherein fire retardant liquid is prevented from flowing through the control valve 22, and a valve open position wherein fire retardant liquid can flow through the control valve 22 to the monitor 20. As is described in greater detail below, the control unit 28 is adapted to move the control valve 22 between the valve closed position and the valve open position in response to commands received from the monitoring center 14 across the communication network 16. Thus, the control valve 22 could be of any suitable type sufficient to be electronically actuated by the control unit 28 and control the flow of fire retardant liquid to the monitor 20, without departing from the scope of the present invention. By way of non-limiting example, the control valve 22 could be a conventional solenoid-actuated ball valve.

As illustrated in FIG. 1, the control valve 22 is disposed adjacent to the source 18. However, those having ordinary skill in the art will appreciate that the control valve 22 could be arranged in any suitable location sufficient to direct fluid towards the monitor 20 from the source 18, without departing from the scope of the present invention. By way of non-limiting example, the control valve 22 could be implemented integrally with or otherwise as a part of the monitor 20, depending on application requirements.

As noted above, the fire suppression system 10 employs a forward looking infrared camera 24 operatively attached adjacent to the monitor 20 which is configured to detect temperature changes occurring within the observation area 12, such as may occur when a fire has ignited in the observation area 12. In one embodiment, the forward looking infrared camera 24 is also configured to transmit thermal imaging data to the monitoring center 14 via the communication network 16, as described in greater detail below. In the representative embodiment illustrated herein, the forward looking infrared camera 24 is operatively attached to the pole 38 adjacent to the monitor 20. However, it will be appreciated that the forward looking infrared camera 24 could be arranged or mounted in any suitable way sufficient to detect temperature changes within the observation area 12, without departing from the scope of the present invention. Moreover, it will be appreciated that the forward looking infrared camera 24 could employ an independent articulation system (not shown) configured to facilitate movement of the infrared camera 24. It is also conceivable that the forward looking infrared camera 24 could be mounted to the articulation system 34 for concurrent movement with the monitor 20 (not shown).

In one embodiment, the fire suppression system 10 further includes a camera 46, such as a conventional color camera, arranged to view to observation area 12. The camera 46 is disposed in electrical communication with the control unit 28 which cooperates with the camera 46 to transmit visual imaging data of the observation area 12 to the monitoring center 14, as described in greater detail below. In the representative embodiment illustrated herein, the camera 46 is operatively attached to the monitor 20 with a bracket, generally indicated at 48, for concurrent movement with the nozzle 30. However, those having ordinary skill in the art will appreciate that the camera 46 could be arranged or mounted in any suitable way sufficient to capture visual imaging data within the observation area 12, without departing from the scope of the present invention.

The forward looking infrared camera 24 is adapted to detect and generate a signal in response to predetermined temperature changes occurring within the observation area 12, which may occur such as in response to ignition of a fire within the observation area 12. To that end, the forward looking infrared camera 24 may be programmed or otherwise configured to generate the signal when the temperature of an object positioned within the observation area 12 reaches one or more predetermined operating limits, such as a specific temperature or temperature/time threshold. By way of non-limiting example, the forward looking infrared camera 24 could generate the signal when an object within the observation area 12 exhibits a surface temperature in excess of 400-degrees Fahrenheit for more than 5 seconds.

As is discussed in greater detail below, the forward looking infrared camera 24 is disposed in electrical communication with the control unit 28 which, in turn, is responsive to the signal and relays the signal to the monitoring center 14 across the communication network 16. Advantageously, the signal generated by the forward looking infrared camera 24 may be realized using conventional direct current voltage, triggered such as by a relay output 50, which may be implemented within the forward looking infrared camera 24 (see FIG. 2). However, those having ordinary skill in the art will appreciate that the signal could be of any suitable type that is generated, communicated, or relayed in any suitable way by the forward looking infrared camera 24 to the control unit 28, or by any other suitable component of the fire suppression system 10, without departing from the scope of the present invention.

In the representative embodiment illustrated herein, the fire suppression system 10 also includes an enclosure, generally indicated at 52, that accommodates the network switch 26 and the control unit 28. The enclosure 52 provides protection from water egress and exposure to the elements. However, those having ordinary skill in the art will appreciate that the fire suppression system 10 could be configured differently, with or without the use of an enclosure 52, without departing from the scope of the present invention.

The network switch 26 of the fire suppression system 10 is used to facilitate communication between the control unit 28 and the monitoring center 14 across the communication network 16. In the representative embodiment illustrated herein, the network switch 26 is realized as a "Power Over Ethernet" network switch that interacts with the monitoring center 14 across the communication network 16 which, in this embodiment, is realized as a conventional "wired" Ethernet or internet connection. However, those having ordinary skill in the art will appreciate that the network switch 26 could be configured differently and could communicate with the monitoring center 14 in a number of different ways without departing from the scope of the present invention. By way of non-limiting example, the network switch 26 could incorporate or otherwise could communicate with the monitoring center 14 across the communication network 16 via a wireless connection point, such as a WiFi local area network connection, or a cellular data connection (not shown, but generally known in the art).

As noted above, the control unit 28 is adapted to relay the signal generated by the forward looking infrared camera 24 to the monitoring center 14 across the communication network 16. In addition, the control unit 28 is adapted to move the control valve 22 between the valve closed position and the valve opened position, as discussed above, in response to subsequent commands received from the monitoring center 14 across the communication network 16. The control unit 28 may also be configured to drive the actuators 32A, 32B, 32C of the nozzle 30 and/or the articulation system 34 so as to move the monitor 20 to aim fire retardant liquid flowing from the nozzle 30, as discussed above.

Referring now to FIG. 2, in one embodiment, the control unit 28 implemented as one or more video encoders 54 connected in electrical communication with the forward looking infrared camera 24. It will be appreciated that the video encoder 54 could also be connected to the camera 46. The video encoder 54 is configured to transmit visual data from the forward looking infrared camera 24 to the monitoring center 14 across the communication network 16 via the network switch 26. It will be appreciated that visual data transmitted from the forward looking infrared camera 24 could include thermal imaging data, such as an overlay of predetermined temperature boundaries or regions representing surface temperatures of one or more objects within the observation area 12. The video encoder 54 may further be configured to transmit visual data from the color camera 46 to the monitoring center 14 across the communication network 16 via the network switch 26.

In the representative embodiment illustrated herein, the encoder 54 includes one or more IO (input/output) connections, generally indicated at 56, which are configured to facilitate sending and/or receiving signals and/or commands across the communication network 16 so as to monitor, actuate, and/or control the various components of the fire suppression system 10. Thus, the IO connections 56 can be configured as outputs disposed in electrical communication with the control valve 22, the nozzle actuator 32A of the nozzle 30, and/or the articulation actuators 32B, 32C of the articulation system 34. Similarly, the IO connections 56 can be configured as inputs disposed in electrical communication with the relay output 50 of the forward looking infrared camera 24, as well as one or more of the sensors 44 of the tank 36 and/or source 18. While the encoder 54 is advantageously configured to include the IO connections 56, it will be appreciated that the control unit 28 could further include a discrete IO controller that communicates across the communication network 16 independent of the encoder 54 (not shown, but generally known in the art).

Those having ordinary skill in the art will appreciate that the schematic representation of the control unit 28 depicted in FIG. 2 is not a wiring diagram and is intended to demonstrate generic electrical communication between the various components of the fire suppression system 10, as indicated by dotted-lines with rounded ends in FIG. 2. Thus, specific wiring and/or electrical connections between the various components of the fire suppression system 10 may necessitate or otherwise benefit from the use of one or more power supplies, fuses, filters, relays, transistors, resistors, and the like (not shown, but generally known in the related art) employed to facilitate electrical communication between the various components of the fire suppression system 10 and/or the monitoring center 14.

In operation, the fire suppression system 10 monitors the observation area 12 for predetermined increases in temperature. Once a fire is detected, the forward looking infrared camera 24 generates a signal via the relay output 50, which is received by the control unit 28 at the input connection 56 of the encoder 54. The encoder 54 subsequently relays the signal to the monitoring center 14 across the communication network 16 via the network switch 26. Advantageously, the monitoring center 14 is realized as an around-the-clock staffed dispatch center, as is known within the privatized security industry, whereby an operator working at the monitoring center 14 will be prompted to the presence of a fire within the observation area 12 via one or more signals received across the communication network 16. The operator can subsequently evaluate signals received from the control unit 28 and selectively control the monitor 20 to extinguish the fire within the observation area 12. To that end, the operator at the monitoring center 14 may view image data received from one or both of the cameras 24, 46, and could selectively actuate one or more input controls (for example a button, a touchscreen, or a joystick: not shown, but generally known in the art) to drive the nozzle actuator 32A of the nozzle 30, the actuators 32B, 32C of the articulation system 34, and/or the control valve 22. In addition, the operator at the monitoring center 14 may view information from one or more of the sensors 44, such as the fluid level and/or pressure of the tank 36. Here, it will be appreciated that the monitoring center 14 could be realized or configured in a number of different ways, using any suitable components or systems sufficient to communicate with the fire suppression system 10 to effect selective actuation of the control valve 22, as described above.

It will be appreciated that the monitoring center 14 is depicted as being adjacent to the fire suppression system 10 for illustrative purposes. As such, those having ordinary skill in the art will appreciate that the monitoring center 14 could be located at any suitable distance from the predetermined observation area 12 so long as commands and signals can be sent and received across the communication network 16. Further, it is conceivable that fire suppression system 10 of the present invention could also cooperate with other types of fire suppression systems. By way of example, the operator at the monitoring center 14 could coordinate with a municipal fire department to dispatch one or more fire trucks to the observation area 12 so as to provide additional fire extinguishing capability.

In this way, the fire suppression system 10 of the present invention can be used to facilitate expedited fire suppression in remote areas that would otherwise be unfit for certain types of actives or use because of their distance from the municipal fire department. In particular, it is conceivable that the predetermined observation area 12 could be located too far away from a local municipal fire department to ensure an adequate response time. Thus, the fire suppression system 10 of the present invention affords significant advantages where immediate fire suppression is required to prevent significant property loss, danger the public at large, and/or potentially uncontrollable fire growth/spread. Further, the fire suppression system 10 of the present invention affords significant advantages where the predetermined observation area 12 encompasses a "high risk," highly flammable, and/or dangerous area. By way of non-limiting example, the fire suppression system 10 of the present invention is particularly advantageous when used in connection with the scrap metal processing industry, wherein the observation area 12 encompasses one or more highly flammable "fluff piles," which are typically stored outdoors and include waste and/or non-metallic byproducts that are separated out as scrap materials are processed and/or broken down. Irrespective of the application, however, the fire suppression system 10 of the present invention significantly improves the detection of fires and, at the same time, facilitates selectively controllable fire extinguishing in an efficient and safe manor.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A fire suppression system located remotely from a monitoring center, the fire suppression system comprising:
   a retardant storage tank storing a fire retardant liquid and including one or more sensors;
   a monitor including a nozzle and at least one actuator, the nozzle in fluid communication with the retardant storage tank, the at least one actuator operable to control a configuration of the monitor;
   a control valve in fluid communication between the retardant storage tank and the nozzle, the control valve operable between a closed position wherein fire retardant liquid is prevented from flowing through the control valve, and an open position wherein fire retardant liquid can flow through the control valve to the nozzle;
   a thermal imaging camera configured to (i) determine a temperature in an observation area and (ii) generate a threshold response signal when the temperature exceeds a threshold temperature; and
   a control unit including a video encoder in communication with the monitoring center over a communications network and having a first video input and a plurality of configurable input/outputs (IOs), the first video input receiving the temperature, the plurality of configurable IOs including (i) a first IO connected to the thermal imaging camera and configured as an input for receiving the threshold response signal from the thermal imaging camera, (ii) a second IO connected to the control valve and configured as an output for transmitting a first command received from the monitoring center for moving the control valve between the open position and the closed position, (iii) a third IO connected to the at least one actuator of the monitor and configured as an output for transmitting a second command from the monitoring center to the at least one actuator to control a configuration of the monitor, and (iv) a fourth IO connected to the one or more sensors and configured as an input for receiving data from the one or more sensors of the retardant storage tank.

2. The fire suppression system of claim 1, wherein the at least one actuator of the nozzle includes a nozzle actuator disposed in electrical communication with the third IO of the control unit, and drivable by the third IO in response to the second command so as to selectively adjust pressure and/or flowrate of fire retardant liquid directed into the observation area when the control valve is in the open position.

3. The fire suppression system of claim 2, wherein the at least one actuator includes an articulation actuator, and the video encoder includes a fifth IO connected to the articulation actuator and configured as an output IO for transmitting a third command from the monitoring center to the articulation actuator to selectively orient the monitor to aim fire retardant liquid flowing into the observation area when the control valve is in the open position.

4. The fire suppression system of claim 1, further including a pressurized gas tank disposed in selective fluid communication with the retardant storage tank for displacing fire retardant liquid to the monitor when the control valve is in the open position.

5. The fire suppression system of claim 1, wherein the monitor is mounted to a pole and is positioned vertically above the retardant storage tank.

6. The fire suppression system of claim 5, wherein the monitor and the retardant storage tank are operable to be selectively positioned with respect to the observation area.

7. The fire suppression system of claim 1, wherein the control valve is mounted adjacent to the retardant storage tank, and further comprising a hose extending vertically from the control valve to the monitor.

8. The fire suppression system as set forth in claim 1, further including a camera in communication with a second video input of the video encoder and configured to selectively provide visual imaging data to the monitoring center across the communication network.

9. The fire suppression system as set forth in claim 8, wherein the camera is operatively attached to the monitor for concurrent movement therewith.

10. The fire suppression system as set forth in claim 1, wherein the thermal imaging camera generates the threshold response signal in response to a predetermined temperature threshold being exceeded within the observation area over a predetermined amount of time.

11. The fire suppression system of claim 1, wherein the communication network is a wireless communication network.

12. The fire suppression system of claim 1, wherein the one or more sensors of the retardant storage tank includes a fluid level sensor and a pressure sensor.

13. The fire suppression system of claim 1, wherein the thermal imaging camera includes a relay output operable to generate the threshold response signal, the threshold response signal being a direct current voltage.

14. A fire suppression system located remotely from a monitoring center, the fire suppression system comprising:
   a video encoder in communication with the monitoring center over a communication network and including a first video input, a second video input, and a plurality of configurable input/outputs each selectively configurable to transmit a signal between the monitoring center and the fire suppression system;
   a thermal imaging camera in communication with the first video input and a first IO of the video encoder, the thermal imaging camera configured to (i) determine a temperature in an observation area, (ii) generate thermal imaging visual data corresponding to the temperature; (iii) transmit the thermal imaging visual data to the first video input, (iv) generate a threshold response signal when the temperature exceeds a threshold temperature, and (v) transmit the threshold response signal to the first IO;
   a retardant storage tank storing a fire retardant liquid and including one or more sensors in communication with a second IO of the video encoder;
   a monitor including a nozzle in fluid communication with the retardant storage tank and at least one actuator in communication with a third TO of the video encoder; and
   a control valve in fluid communication between the retardant storage tank and the nozzle for selectively permitting a flow of the fire retardant liquid from the retardant storage tank to the nozzle, the control valve in communication with a fourth TO of the video encoder.

15. A fire suppression system remotely located from a monitoring center, the fire suppression system comprising:
   a retardant storage tank storing a fire retardant liquid and including one or more sensors; a control valve in fluid communication with the retardant storage tank and operable between an open position and a closed position for selectively permitting a flow of the fire retardant liquid from the retardant storage tank;
a monitor including a nozzle and at least one actuator, the nozzle in fluid communication with the retardant storage tank;
a video encoder in communication with the monitoring center over a communication network, the video encoder comprising a first video input and a plurality of configurable input/outputs (IOs), each IO of the plurality of configurable IOs selectively configured to send and/or receive data between the monitoring center and the fire suppression system; and
a thermal imaging camera in communication with the first video input and a first IO of the video encoder, the thermal imaging camera configured to (i) determine a temperature in an observation area, (ii) generate thermal imaging visual data corresponding to the temperature, and (iii) generate a threshold response signal when the temperature exceeds a threshold temperature,
wherein the video encoder is configured to perform operations comprising:
receiving, at the first video input, the thermal imaging visual data from the thermal imaging camera;
receiving, at the first IO of the plurality of configurable IOs, the threshold response from the thermal imaging camera in communication with the first IO;
receiving, at a second IO of the plurality of configurable IOs, sensor data from the one or more sensors of the retardant storage tank, the sensor data relating to at least one of a pressure or a fluid level of the retardant storage tank;
transmitting, to the monitoring center, the thermal imaging visual data, the threshold response signal, and the sensor data;
receiving, from the monitoring center, a first command to move the control valve from the closed position to the open position to permit the flow of the fire retardant liquid from the retardant storage tank to the monitor;
transmitting, from a third IO of the plurality of configurable IOs, the first command to the control valve to move the control valve to the open position;
receiving, from the monitoring center, a second command for controlling the at least one actuator of the monitor; and
transmitting, from a fourth IO of the plurality of configurable IOs, the second command to the at least one actuator of the monitor.

* * * * *